United States Patent
Williammee et al.

(10) Patent No.: US 10,708,834 B2
(45) Date of Patent: Jul. 7, 2020

(54) CARRIER SWITCHING

(71) Applicant: Google LLC, Mountain View, CA (US)

(72) Inventors: Brian Williammee, Palo Alto, CA (US); Myra Nam, Mountain View, CA (US); Xuan Zheng, Mountain View, CA (US); Weihua Tan, Fremont, CA (US); Jean Choi, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/828,393

(22) Filed: Nov. 30, 2017

(65) Prior Publication Data

US 2019/0166534 A1    May 30, 2019

(51) Int. Cl.
*H04W 36/14*    (2009.01)
*H04W 36/32*    (2009.01)

(52) U.S. Cl.
CPC .......... *H04W 36/14* (2013.01); *H04W 36/32* (2013.01)

(58) Field of Classification Search
CPC ............................. H04W 36/14; H04W 36/32
See application file for complete search history.

(56) References Cited

U.S. PATENT DOCUMENTS

| | | | | |
|---|---|---|---|---|
| 8,094,630 B2* | 1/2012 | Garg | ..................... | H04W 36/30 370/338 |
| 8,099,125 B2* | 1/2012 | Morrill | ................. | H04W 48/16 455/432.1 |
| 8,391,192 B2* | 3/2013 | Prakash | ................ | H04W 36/30 370/310 |
| 8,565,766 B2* | 10/2013 | Scherzer | ............... | H04W 72/02 455/432.3 |
| 9,184,968 B2* | 11/2015 | Dimou | .................... | H04B 15/00 |
| 9,264,966 B2* | 2/2016 | Salvador | ............. | H04W 36/245 |
| 9,271,161 B2* | 2/2016 | Ishii | ........................ | H04L 5/001 |
| 9,414,219 B2* | 8/2016 | Shao | ....................... | H04W 8/18 |
| 9,648,537 B2* | 5/2017 | Tan | ....................... | H04W 36/30 |
| 10,039,016 B1* | 7/2018 | Larish | .................... | H04W 24/02 |
| 10,063,578 B2* | 8/2018 | Flacher | ................... | H04L 67/10 |
| 10,368,284 B2* | 7/2019 | Lau | ....................... | H04W 88/12 |
| 2011/0131333 A1* | 6/2011 | Buffmire | ............... | H04W 4/021 709/227 |

(Continued)

*Primary Examiner* — Huy D Vu
*Assistant Examiner* — Bailor C. Hsu
(74) *Attorney, Agent, or Firm* — Honigman LLP; Brett A. Krueger (57) ABSTRACT

A method includes receiving a carrier switching model, determining that user equipment (UE) is transitioning between carrier cells based on at least one connection performance metric of the UE, and obtaining a current UE location and any available carrier networks of carriers relative to the current UE location. The method also includes determining a carrier switch score for each available carrier network using the carrier switching model and determining to switch carrier networks based on the carrier switch score of a currently-connected available carrier network relative to the carrier switch score of another available carrier network. Each carrier switch score is based on at least one of a predicted signal strength or a predicted radio access technology over a threshold period of time for the respective available carrier network. The method also includes causing the UE to switch connection to the other available carrier network.

22 Claims, 6 Drawing Sheets

(56) References Cited

U.S. PATENT DOCUMENTS

| | | | |
|---|---|---|---|
| 2013/0246600 A1* | 9/2013 | Ohnishi | H04L 41/50 709/223 |
| 2015/0332222 A1* | 11/2015 | Wang | G06Q 20/02 705/39 |
| 2017/0238316 A1* | 8/2017 | Li | H04W 72/048 370/329 |
| 2017/0337486 A1* | 11/2017 | Zang | G06N 5/02 |
| 2018/0220340 A1* | 8/2018 | Ramachandra | H04W 36/0094 |

* cited by examiner

CARRIER SWITCHING

TECHNICAL FIELD

This disclosure relates to switching carrier networks.

BACKGROUND

A mobile network operator (MNO) generally provides wireless communication/network services to end users and includes all of the components and controls necessary to supply each end user a radio frequency assignment. Typically, a mobile virtual network operator (MVNO) can buy access to network services from an MNO for a fee and then resell the network services to the end user. In doing so, the MVNO is alleviated from incurring the high overhead costs associated with buying, installing, and maintaining all of the components and controls necessary to provide the network services to the end user.

SUMMARY

For an MVNO that provides user equipment (UE) access to multiple carrier networks each controlled by a corresponding MNO, it may be desirable to keep the UE connected to the best carrier network at all times. However, as switching from one carrier network to another carrier network usually increases battery consumption by the end user device, breaks active connections, and typically requires up to about 180 seconds of dead time to complete the switch, the number of times the UE switches carrier networks should be minimized. UEs may obtain crowd-sourced data that reflects connection quality obtained from other end user devices at a same location to determine which carrier network is the best at that location. Additionally, UEs may switch to an available network carrier offering Long-Term Evolution (LTE) connectively when the network carrier the end user device is currently connected to is using a radio access technology (RAT) other than LTE. The present disclosure describes implementations for switching carrier networks, for example, while minimizing adverse user experiences.

One aspect of the disclosure provides a method for switching carrier networks. The method includes receiving, at data processing hardware of a UE, a carrier switching model and determining, by the data processing hardware, that the UE is transitioning between carrier cells based on at least one connection performance metric of the UE. The method also includes obtaining, at the data processing hardware, a current UE location and any available carrier networks of carriers (e.g., identifiers or descriptions of available carrier networks) relative to the current UE location. The method further includes determining, by the data processing hardware, a carrier switch score for each available carrier network using the carrier switching model, each carrier switch score based on at least one of a predicted signal strength or a predicted radio access technology over a threshold period of time for the respective available carrier network. The method also includes determining, by the data processing hardware, to switch carrier networks based on the carrier switch score of a currently-connected available carrier network relative to the carrier switch score of another available carrier network. The method also includes causing, by the data processing hardware, the UE to switch connection to the other available carrier network.

Implementations of the disclosure may include one or more of the following optional features. In some implementations, the carrier switching model is generated by a carrier switching machine learning algorithm based on one or more features including a currently-connected carrier network, one or more available carrier networks, signal strength, radio access technology, length of time on a radio access technology, voice service state, mobile service state, detected activity, type of UE, current network cell recommendation, nearby network cell recommendation, indoor/outdoor UE location, bearing, or speed. The carrier switching model may also be trained on data including crowd-sourced user-experience ratings of carrier networks at corresponding UE locations. The connection performance metric may include signal strength.

In some examples, determining the carrier switch score for each available carrier network includes, for each available carrier network, executing the carrier switching model using the current UE location and the respective available carrier network as inputs for the carrier switching model. Optionally, determining to switch carrier networks may include determining that the corresponding carrier switch score of the other available carrier network satisfies a threshold criterion. Here, the threshold criterion may include a threshold difference between the carrier switch score of the currently-connected available carrier network and the carrier switch score of the other available carrier network.

Another aspect of the disclosure provides a method for switching carrier networks. The method includes receiving, at data processing hardware of a user equipment (UE), a carrier switching model. The method also includes determining, by the data processing hardware, that the UE is transitioning between carrier cells based on signal strength and obtaining, at the data processing hardware, a current UE location and any available carrier networks of carriers (e.g., identifiers or descriptions of available carrier networks) relative to the current UE location. The method further includes determining, by the data processing hardware, to switch carrier networks by: determining, using the carrier switching model, a first carrier switch score for a currently-connected first available carrier network based on the UE location; determining, using the carrier switching model, a second carrier switch score for a second available carrier network based on the UE location; and determining that the second carrier switch score for the second available carrier network satisfies a threshold criterion. Each carrier switch score is based on at least one of a predicted signal strength or a predicted radio access technology over a threshold period of time for the respective available carrier network. The method also includes causing, by the data processing hardware, the UE to switch connection to the second available carrier network.

Implementations of this aspect of the disclosure may include one or more of the following optional features. In some configurations, the carrier switching model is generated by a carrier switching machine learning algorithm based on one or more features including a currently-connected carrier network, one or more available carrier networks, signal strength, radio access technology, length of time on a radio access technology, voice service state, mobile service state, detected activity, type of UE, current network cell recommendation, nearby network cell recommendation, indoor/outdoor UE location, bearing, or speed. Optionally, the carrier switching model may also be trained on data including crowd-sourced user-experience ratings of carrier networks at corresponding UE locations. Additionally or alternatively, the threshold criterion includes a threshold difference between the carrier switch score of the first available carrier network and the carrier switch score of the second available carrier network.

Yet another aspect of the disclosure provides a user equipment (UE). The user equipment includes data processing hardware and memory hardware in communication with the data processing hardware. The memory hardware stores instructions that when executed on the data processing hardware cause the data processing hardware to perform operations. The operations include receiving a carrier switching model and determining that the UE is transitioning between carrier cells based on at least one connection performance metric of the UE. The operations also include obtaining a current UE location and any available carrier networks of carriers (e.g., identifiers or descriptions of available carrier networks) relative to the current UE location. The operations further include determining a carrier switch score for each available carrier network using the carrier switching model. Each carrier switch score is based on at least one of a predicted signal strength or a predicted radio access technology over a threshold period of time for the respective available carrier network. The operations also include determining to switch carrier networks based on the carrier switch score of a currently-connected available carrier network relative to the carrier switch score of another available carrier network and include causing the UE to switch connection to the other available carrier network.

Implementations of this aspect of the disclosure may include one or more of the following optional features. In some examples, the carrier switching model is generated by a carrier switching machine learning algorithm based on one or more features including a currently-connected carrier network, one or more available carrier networks, signal strength, radio access technology, length of time on a radio access technology, voice service state, mobile service state, detected activity, type of UE, current network cell recommendation, nearby network cell recommendation, indoor/outdoor UE location, bearing, or speed. Additionally or alternatively, the carrier switching model may be trained on data including crowd-sourced user-experience ratings of carrier networks at corresponding UE locations. The connection performance metric may include signal strength.

In some implementations, determining the carrier switch score for each available carrier network includes, for each available carrier network, executing the carrier switching model using the current UE location and the respective available carrier network as inputs for the carrier switching model. Determining to switch carrier networks may include determining that the corresponding carrier switch score of the other available carrier network satisfies a threshold criterion. Optionally, the threshold criterion may include a threshold difference between the carrier switch score of the currently-connected available carrier network and the carrier switch score of the other available carrier network.

Another aspect of the disclosure provides a user equipment (UE). The user equipment includes data processing hardware and memory hardware in communication with the data processing hardware, the memory hardware storing instructions that when executed on the data processing hardware cause the data processing hardware to perform operations. The operations include receiving a carrier switching model and determining that the UE is transitioning between carrier cells based on signal strength. The operations also include obtaining a current UE location and any available carrier networks of carriers (e.g., identifiers or descriptions of available carrier networks) relative to the current UE location. The operations further include determining to switch carrier networks by: determining, using the carrier switching model, a first carrier switch score for a currently-connected first available carrier network based on the UE location; determining, using the carrier switching model, a second carrier switch score for a second available carrier network based on the UE location; and determining that the second carrier switch score for the second available carrier network satisfies a threshold criterion. Each carrier switch score is based on at least one of a predicted signal strength or a predicted radio access technology over a threshold period of time for the respective available carrier network. The operations also include causing the UE to switch connection to the second available carrier network.

Implementations of this aspect of the disclosure may include one or more of the following optional features. In some implementations, the carrier switching model is generated by a carrier switching machine learning algorithm based on one or more features including a currently-connected carrier network, one or more available carrier networks, signal strength, radio access technology, length of time on a radio access technology, voice service state, mobile service state, detected activity, type of UE, current network cell recommendation, nearby network cell recommendation, indoor/outdoor UE location, bearing, or speed. The carrier switching model may also be trained on data including crowd-sourced user-experience ratings of carrier networks at corresponding UE locations. Optionally, the threshold criterion includes a threshold difference between the carrier switch score of the first available carrier network and the carrier switch score of the second available carrier network.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

A mobile virtual network operator (MVNO) may provide user equipment (UE) access to multiple carrier networks and the UE may connect to the available carrier network that will offer the best user experience. Since switching a UE connection from one available carrier network to another available carrier network will break an active data session, require up to about 180 seconds of dead time to complete the switch, and reduces battery life of the UE, it is desirable to accurately predict that switching to the other available network carrier is in fact warranted before the UE switches carrier networks. While a UE can look-up a best carrier network at a current location of the UE by accessing crowd-sourced user-experience ratings of carrier networks at the current location, the use of such crowd-sourced user-experience ratings does not provide any information of what the network quality will be like for the UE during a future time period, e.g., such as 30 minutes from making the switch. Moreover, heuristics that trigger a UE to switch to a carrier network associated with a Long-Term Evolution (LTE) connection from a carrier network associated with a non-LTE connection may ultimately result in the UE switching to a worse network experience than the carrier network associated with the non-LTE connection.

Implementations herein are directed toward providing a UE a carrier switching model for use in determining a carrier switch score for each available carrier network relative to a current location of the UE and determining to switch carrier networks based on the carrier switch score of a currently-connected available carrier network relative to the carrier switch score of another available carrier network. Thus, for each available carrier network, the UE may execute the carrier switching model using the current UE location and the respective available carrier network as inputs for the carrier switching model to determine the respective carrier switch score. Here, each carrier switch score may be based on a predicted signal strength and/or a predicted RAT over a threshold period of time for the respective available network. For instance, the carrier switch score for each available carrier network may take into account a predicted signal strength and/or predicted RAT at multiple intervals (e.g., every minute) over the threshold period of time (e.g., 120 minutes). The carrier switch scores for the available carrier networks may further rely on other features available to the UE such as whether or not the UE is driving or stationary, a current speed and/or heading, and/or crowd-sourced user-experience ratings at both a current carrier cell and nearby carrier cells.

When another available carrier network is associated with a higher carrier switch score than the currently-connected available carrier network, the UE may switch to the other available carrier network. Otherwise, the UE may maintain the connection with the currently-connected available carrier network. In some examples, the other available carrier network must satisfy a threshold criterion, such as exceeding a threshold carrier switch score, before the UE device warrants the switch to the other carrier network. Additionally or alternatively, the threshold criterion may include a threshold difference between the carrier switch score of the currently-connected available carrier network and the carrier switch score of the available carrier network so that the benefit of performing the switch outweighs the costs associated with switching downtime and reduced battery life.

Figure 1:
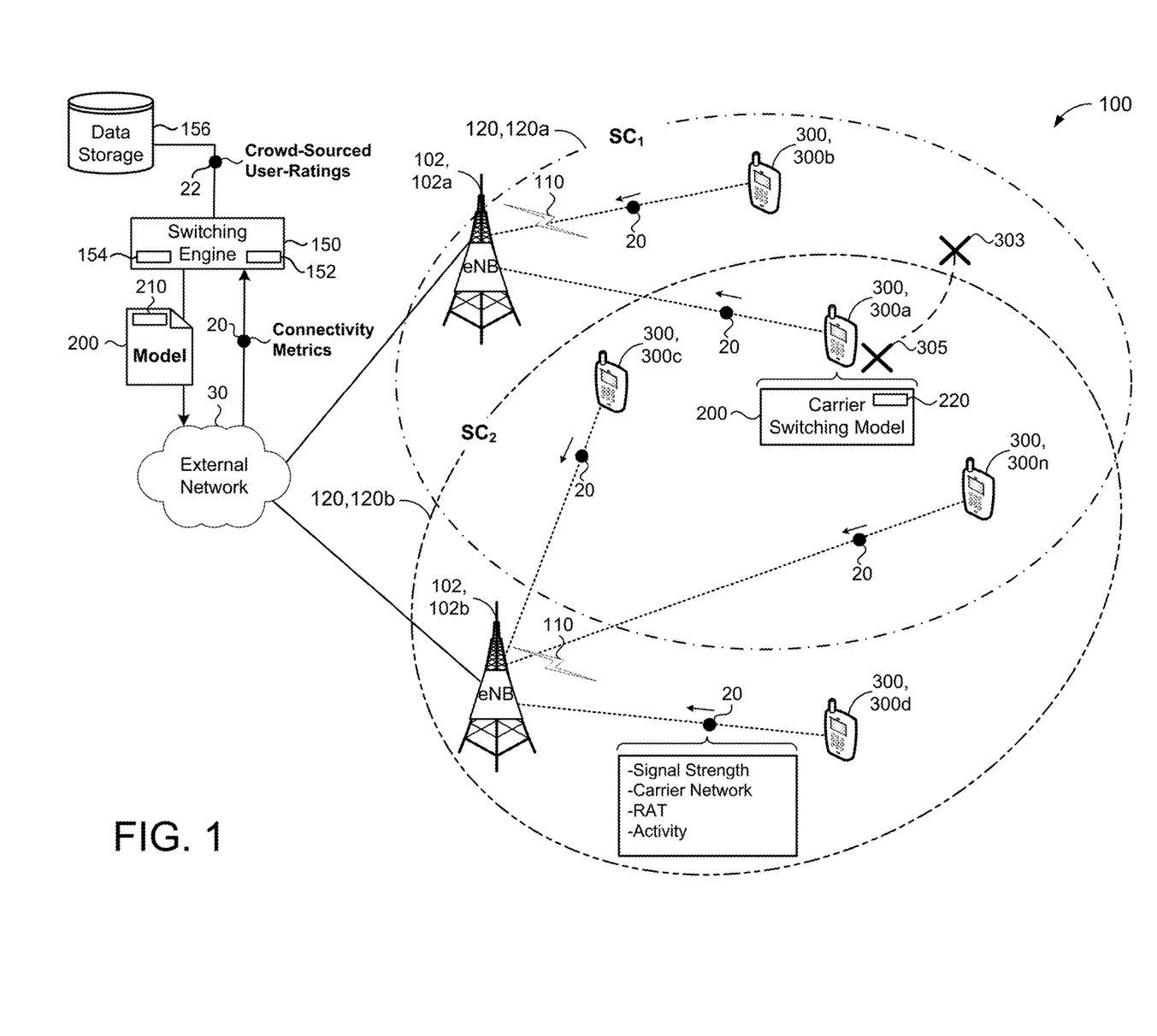
FIG. 1 is schematic view of an example wireless communication environment.

Referring to FIG. 1, in some implementations, a wireless communication environment 100 for a mobile virtual network operator (MVNO) includes multiple subscribing user equipment (UE) devices 300, 300a-n in communication with an external network 30 through carrier networks 120, 120a-b via base stations 102, 102a-b. Each base station 102 may include an evolved Node B (also referred as eNode B or eNB). An eNB 102 includes hardware that connects to an air interface 110 (e.g., a mobile phone network) for communicating directly with the UEs 300. For instance, the eNB 102 may transmit downlink signals (e.g., communications) to the UEs 300 and receive uplink signals from the UEs 300 over the air interface 110. The eNB 102 does not have a separate controller element and, thus, simplifies the architecture of the carrier networks 120. In addition, the eNB 102 embeds its own control functionality, since the eNB 102 does not include a separate controller element. The eNB 102 uses multiple protocols when interfacing with different elements. For example, the eNB 102 may use an S1-interface as a backhaul link for communicating with the external network 30.

UEs 300 may be any telecommunication device that is capable of transmitting and/or receiving voice/data over the carrier networks 120. UEs 300 may include, but are not limited to, mobile computing devices, such as laptops, tablets, smart phones, and wearable computing devices (e.g., headsets and/or watches). UEs 300 may also include other computing devices having other form factors, such as computing devices included in desktop computers, vehicles, gaming devices, televisions, or other appliances (e.g., networked home automation devices and home appliances).

Each base station 102 provides a corresponding serving cell $SC_1$, $SC_2$ for the corresponding carrier network 120, 120a-b. The terms serving cell and carrier cell may be used interchangeably. Thus, the carrier networks 120 are available to connect with any UEs 300 residing within their corresponding serving cells $SC_1$, $SC_2$. For instance, a first network carrier 120a is available to the UEs 300a, 300b, 300c, 300n within the corresponding serving cell $SC_1$. Similarly, a second network carrier 120b is available to the UEs 300a, 300c, 300n, 300d within the corresponding serving cell $SC_2$. Accordingly, both the first and second carrier networks 120a, 120b are available for the UEs 300a, 300c, 300n to connect with for access to the external network 30, while the second carrier network 120b is unavailable to the UE 300b and the first carrier network 120a is unavailable to the UE 300d. In the example shown, the UEs 300a, 300b have active connections with the first carrier network 120a via the first base station 102a and the UEs 300c, 300d, 300n have active connections with the second carrier network 120b via the second base station 102b.

The first carrier network 120a and the second carrier network 120b may be independently operated, such that the first network carrier 120a is associated with a first carrier (e.g., a first mobile network operator (MNO) that deploys the first base station 102a to administer coverage within the first $SC_1$, and the second network carrier 120b is associated with a second carrier (e.g., a second MNO) that deploys the second base station 102b to administer coverage within the second $SC_2$. In the example shown, the UEs 300a-n are subscribers of the MVNO and the MVNO provides the UEs 300a-n access to the carrier networks 120a, 120b. While two separate carrier networks 120a, 120b are shown, the example wireless communication environment 100 may provide three or more carrier networks 120 each associated with a different carrier (e.g., different MNO) without departing from the scope of the present disclosure. Here, a subscribing UE 300 may connect to any available carrier network 120 providing the best network quality. As used herein, the term "network quality" may refer to data throughput, network latency, or any other network parameter that can be correlated with user satisfaction when connected to a carrier network 120.

Radio access technologies (RATs) used by the carrier networks 120a, 120b within the corresponding serving cells $SC_1$, $SC_2$ can include a General Packet Radio Service (GPRS) network, a Universal Mobile Telecommunications System (UMTS) network, a High Speed Packet Access (HSPA) network, an enhanced-HSPA (H+) network, an Enhanced Data Rates for Global System for Mobile communications (GSM) (EDGE) network, or a Long-Term Evolution (LTE) network. LTE is a standard for wireless communication of high-speed data for mobile phones and data terminals. LTE is based on the GSM/EDGE and UMTS/HSPA network technologies and is configured to increase the capacity and speed of the telecommunication by using different radio interfaces in addition to core network improvements. LTE supports scalable carrier bandwidths, from 1.4 MHz to 20 MHz and supports both frequency division duplexing (FDD) and time-division duplexing (TDD). While a connection to a carrier network 120 offering an LTE connection should generally offer better network quality for the UE 300 than to another carrier network 120 offering a non-LTE connection (e.g., GPRS or UMTS), this is not always the case. For instance, the UE 300 may be located near a boundary of a serving cell $SC_1$, $SC_2$ associated with the LTE connection and, therefore, may have poor reception (e.g., poor signal strength) when connected to that carrier network 120. On the other hand, the UE 300 may have much better reception (e.g., strong signal strength) at the same location if the UE 300 were to connect to the other carrier network 120 offering the non-LTE connection.

In some implementations, a switching engine 150 executes on a remote system (e.g., cloud environment) for generating a carrier switching model 200. Described in greater detail below, each UE 300 is configured to receive (e.g., download) and execute the carrier switching model 200 for use in predicting which carrier network 120 among multiple available carrier networks 120 (e.g., two or more) will provide a best network quality over a threshold period of time. Based on the output(s) of the carrier switching model 200, a UE 300 may stay on a currently-connected available carrier network 120 or switch to another available carrier network 120.

The switching engine 150 may include data processing hardware 152 (e.g., one or more computing resources) and memory hardware 154 (e.g., one or more storage resources) in communication with the data processing hardware 152. The memory hardware 154 may store instructions, that when executed by the data processing hardware 152, cause the data processing hardware 152 to execute the switching engine 150 to generate the carrier switching model 200. The carrier switching model 200 may be continuously updated based on new data and the switching engine 150 may deploy updated carrier switching models 200 to the UEs 300 as needed. In some examples, the UEs 300 may check for updates to the model 200 when connected to a Wi-Fi network and download the model 200 when an update is available.

In some examples, the switching engine 150 executes a switching machine learning algorithm that generates the carrier switching model 200 based on one or more features 210. The features 210 used by the switching engine 150 for generating the carrier switching model 200 may be based on connection performance metrics 20 associated with connections to corresponding carrier networks 120. The connection performance metrics 20 may be crowd-sourced from multiple UEs 300. For instance, each UE 300 may periodically report one or more connection performance metrics 20 for a corresponding carrier network 120 the UE 300 is actively connected to in the wireless communication environment 100. In the example shown, the UE 300d reports connection performance metrics 20 for the active connection to the second carrier network 120b that include at least one of signal strength (e.g., received signal strength indication (RSSI)), the currently-connected carrier network 120 (e.g., the second carrier network 120b), the RAT (e.g., LTE, H+, GPRS, UMTS, etc.) associated with the currently-connected carrier network 120, or an activity associated with the UE 300d. The activity of the UE 300d may indicate whether the UE 300d is driving or stationary. Optionally, the connection performance metrics 20 reported by the UEs 300 may additionally or alternatively include a length of time on the current RAT, a voice service state, a mobile service state, device type (e.g., model/make of UE), hour of week, throughput/latency, operating system executing on UE 300, whether the UE 300 is located indoors or outdoors, a bearing (e.g., direction) of the UE 300, or a speed of the UE 300. The UEs 300 may optionally include their current location 305 associated with the one or more connection performance metrics 20. In some implementations, the connection performance metrics 20 are logged by the UEs 300 over a threshold period of time after switching carrier networks and the switching engine 150 receives the logged metrics 20 for use in training the carrier switching model 200.

Figure 2:
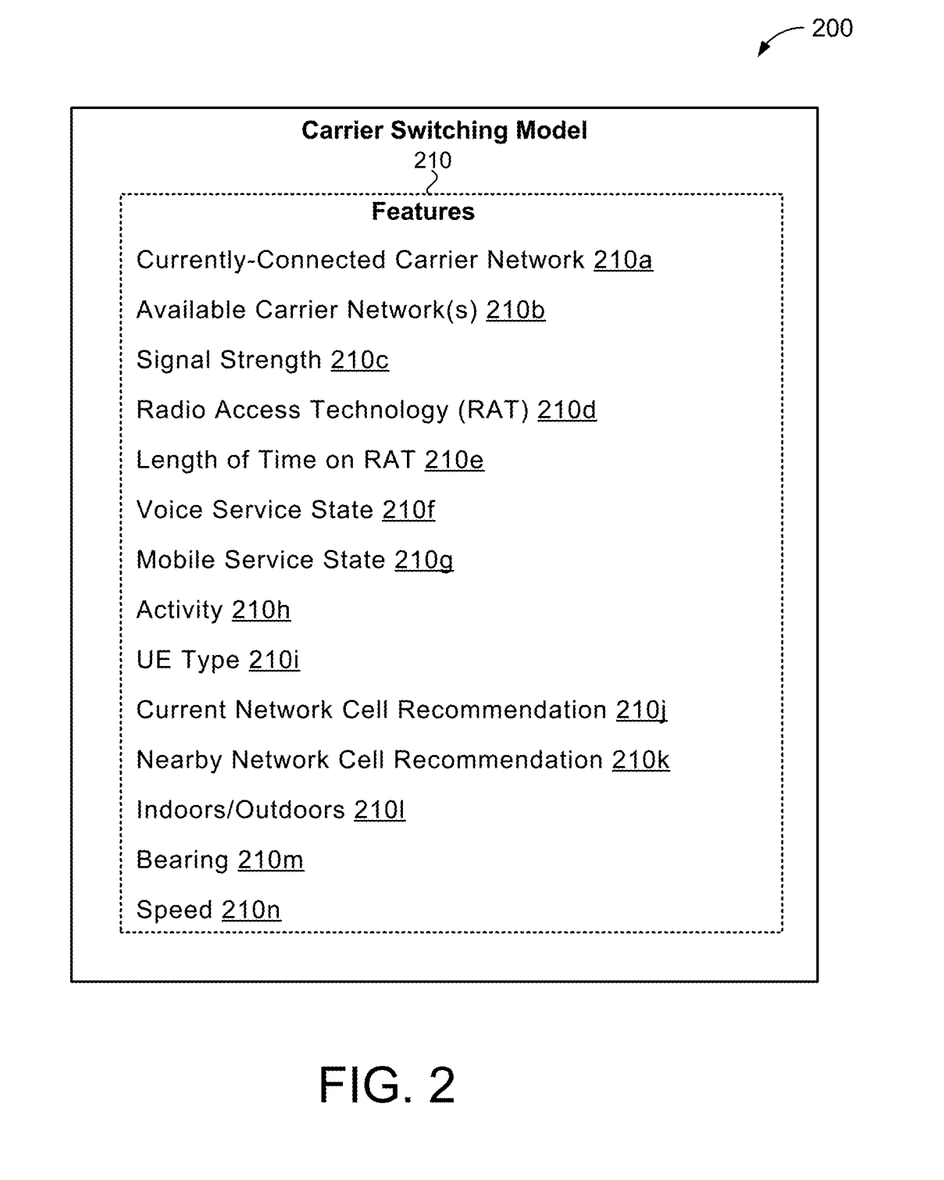
FIG. 2 provides a schematic view of features associated with a carrier switching model.

In some implementations, the switching engine 150 compiles logs of connection performance metrics 20 to determine the features 210 for use as inputs to generate and train the carrier switching model 200. Ultimately, the features 210 input to the carrier switching model 200 are selected to define a proxy for customer satisfaction in terms of network quality when connected to a given carrier network 120. The carrier switching model 200 may learn relationships between two or more features 210 and/or learn nonlinearities for different values of features 210. FIG. 2 shows an example carrier switching model 200 based on one or more features 210, 210a-n. The features 210 associated with the carrier switching model 200 include at least one of a currently-connected carrier network feature 210a, available carrier networks feature 210b, signal strength feature 210c, RAT feature 210d, length of time on RAT feature 210e, voice service state feature 210f, mobile service state feature 210g, detected activity feature 210h, UE type feature 210i, current network cell recommendation feature 210j, nearby network cell recommendation(s) feature 210k, indoors/outdoors feature 210l, bearing feature 210m, or speed feature 210n.

The currently-connected carrier network feature 210a corresponds to the carrier network 120 that a UE 300 is actively connected to and the available carrier networks feature 210b correspond to one or more available carrier networks 120 of carriers relative to a current location 305 of the UE 300. The signal strength feature 210c may include a RSSI value and/or other parameter (e.g., cell signal strength rating) that may correlate to a strength of an active connection a UE 300 has with a carrier network 120, while the RAT feature 210d indicates the type of connection the UE 300 has with a carrier network 120 (e.g., as indicated by feature 210a) and assign a score/value for the type of connection. For example, the RAT feature 210d may assign a score/value for each of the LTE, H+, or UMTS. The voice service state 210f indicates whether voice telephony is in service, out of service, emergency only, or off. The mobile service state 210g may indicate whether the UE 300 is actively connected to a carrier network 120 or to a local Wi-Fi network. The detected activity feature 210h indicates whether a UE 300 is driving or stationary. The UE type feature 210i indicates the make/model of a UE 300. For instance, the UE type feature 210i may specify that a UE corresponds a smartphone and the particular brand/model of the smartphone.

The current network cell recommendation feature 210j may provide a recommendation of the best carrier network 120 relative to a current UE location 305 and the nearby network cell recommendation feature 210k may provide a recommendation of the best carrier network 120 for each of one or more neighboring service cells relative to a current UE location 305. Here, the recommendation of a best carrier network for a neighboring network cell can be useful for the carrier switching model 200 executing on a UE 300 that is currently driving such that the UE 300 can be predicted to be within that neighboring network cell during a future period time period. The speed feature 210*m* may indicate a speed of a UE 300 and the bearing feature 210*n* may indicate a direction a UE 300 is currently heading. Together, the detected activity, speed, and bearing features 210*h*, 210*m*, 210*n* can predict whether or not the UE 300 is predicted to enter a nearby network cell. In this scenario, the nearby network cell recommendation feature 210*k* can be weighted heavier when the UE 300 is predicted to enter that nearby network cell in the future.

Referring back to FIG. 1, in some implementations, the switching engine 150 trains the carrier switching model 200 using crowd-sourced data 22 obtained from data storage 156 that includes crowd-sourced user-experience ratings of carrier networks 120 at corresponding UE locations 305. As used herein, the crowd-sourced user-experience ratings may include network cell recommendation at corresponding UE locations 305. Put another way, the crowd-sourced user-experience ratings provide a location-based heuristic that indicates a network quality experienced by other UEs connected to a corresponding carrier network 120 at a corresponding UE location 305. Connection performance metrics 20 such as signal strength (e.g., RSSI) and/or the RAT (e.g., LTE or GPRS) may indicate the network quality associated with a carrier network 120 at a location 305. In some examples, the current and nearby network cell recommendation features 210*j*, 210*k* may be based on the crowd-sourced data 22. The features 210 and the crowd-sourced data 22 may be based on the connection performance metrics 20 periodically reported by UEs 300 during connections with corresponding carrier networks 120.

In the example shown, the UE 300*a* executes the carrier switch model 200 to determine whether the UE 300*a* should remain connected to the first carrier network 120*a* (e.g., currently-connected available carrier network) or switch connection to the second carrier network 120*b* (e.g., other available carrier network). In some examples, the UE 300*a* triggers execution of the carrier switch model 200 upon transitioning between carrier cells SC$_1$, SC$_2$ of the same or different carrier networks 120. For instance, the UE 300*a* may transition into the second carrier cell SC$_2$ when moving from a previous location 303 to a current location 305. The UE 300*a* may determine the transition between carrier cells based on at least one connection performance metric 20. For example, the signal strength associated with the second carrier network 120*b* may increase as the UE 300*a* moves from the previous location 303 to the current location 305. The transition between carrier cells may optionally be triggered based on geo-boundaries defining the boundaries of the carrier cells SC$_1$, SC$_2$.

The UE 300*a* may obtain the current location 305 and any available carrier networks 120 relative to the UE location 305. Here, the first carrier network 120*a* and the second carrier network 120*b* are both "available" carrier networks 120 that the UE 300*a* may connect with at the current location 305. In order to determine/predict which of the available carrier networks 120*a*, 120*b* will provide the best network quality over a threshold period of time, the UE 300*a* uses the carrier switching model 200 to determine a carrier switch score 220 for each available carrier network 120 based on at least one of a predicted signal strength and/or predicted RAT over the threshold period of time. If the carrier switch score 220 for the second available carrier network 120*b* is greater than the carrier switch score 220 for the currently-connected available carrier network 120*a* by a threshold criterion, then the UE 300 may decide to switch connection to the second available carrier network 120*b*.

The threshold period of time can include any value. For instance, the threshold period of time could be 30 minutes, 60 minutes, 90 minutes, or 120 minutes. In some implementations, the UE 300*a* divides the threshold period of time into fixed intervals and assigns a score for each interval and sums all the scores to determine the carrier switch score 220 for the carrier network 120 over the threshold period of time. In some examples, the scores at fixed intervals closer to the present time are weighted heavier than the scores at the fixed intervals near the end of the threshold period of time since predictions closer in time are more accurate. Optionally, exponential decay may be applied to the scores associated with fixed intervals further in the future from the present time. The carrier switch score 220 may be based on other features 210 in addition to, or in lieu of, the predicted signal strength and/or predicted RAT over the threshold period of time.

In some implementations, the features 210 of the carrier switching model 200 are initially trained on data including crowd-sourced user-experience ratings of carrier networks at corresponding UE locations 305. For instance, the crowd-sourced user-experience ratings may indicate connection quality after a switching decision to another carrier network 120 is made by a UE 300 at a given location. Here, the connection quality can be obtained from connection performance metrics 20 including, without limitation, signal strength, LTE uptime, and/or voice uptime. The connection quality after the switching decision may be logged over the threshold period of time, e.g., over 10 minutes, over 30 minutes, over 120 minutes. In some examples, training the carrier switching model 200 includes assigning a score for the RAT and/or the signal strength after the switch to the other carrier network 120 at each minute of the threshold period of time. For instance, a score of "30" may be assigned to a LTE connection, a score of "20" may be assigned for a GPRS connection, and a score of "0" may be assigned for no signal/connection. Likewise, higher score values can be assigned for stronger signal strength values (e.g., RSSI) than the score values assigned for weaker signal strength values. The values for the scores can be selected/tuned to serve as a proxy for customer satisfaction in terms of network/connection quality for the respective carrier network 120. Other connection performance metrics 20 may be logged over the threshold period of time to determine the connection quality after the switching decision. For instance, the detected activity of the UE 300, speed, bearing, mobile service state, current network cell recommendation, or nearby network cell recommendation may all be logged by the UE 300 after making a switching decision. The generated model 200 may compare these logged features/metrics and assigned scores with real-time features/metrics for a given UE at a corresponding UE location 305 when the UE 300 is making a decision whether to stay on a currently-connected available carrier network 120 or switch connection to another available carrier network 120.

The switching engine 150 may employ one or more machine learning algorithms for generating the carrier switching model 200. The machine learning algorithms (e.g., modeling algorithms) may include neural networks, linear regression, or decision forest. Neural networks, whether the standard feed-forward type or the recurrent type, are associated with the best predictive power compared to linear regression and decision forest. For instance, a neural network can automatically learn relationships between different features 210 as well as nonlinearities in the features. For instance, automatically learned relationships may include a neural network determining that a nearby network cell recommendation feature 210k is more important when the detected activity, bearing, and speed features 210h, 210m, 210n indicate that a UE 300 is moving toward that neighboring/nearby cell. On the other hand, learned nonlinearities may include a neural network determining that RSSI values ranging from −70 decibels-milliwatt (dBm) to −60 dBm on a carrier network do not have much impact on network quality while RSSI values ranging from −120 dBm and −110 dBm on the same carrier network greatly influence the network quality. While neural networks provide the best predictive power, their drawbacks include the worst interpretability (e.g., opaque), slow inference speeds, and the largest model size compared to linear regression and decision forest.

Linear regression provides better interpretability, faster inference speeds, and a smaller model size than the neural network and the decision forest. For instance, linear regression can state that a particular available carrier network is predicted to have the best network quality because of values/scores of particular features. Linear regression lacks, however, the predictive power of neural networks to automatically learn relationships between features and nonlinearities. However, careful feature engineering for linear regression can overcome these predictive power drawbacks. For instance, feature engineering can include explicitly stating which features should interact with each other to learn more complicated relationships (e.g., detected activity feature 210h, nearby network cell recommendation feature 210k, current RAT feature 210d, and length of time on RAT feature 210e), thereby allowing piecewise linear functions to be learned on a feature-by-feature basis.

Figure 3:
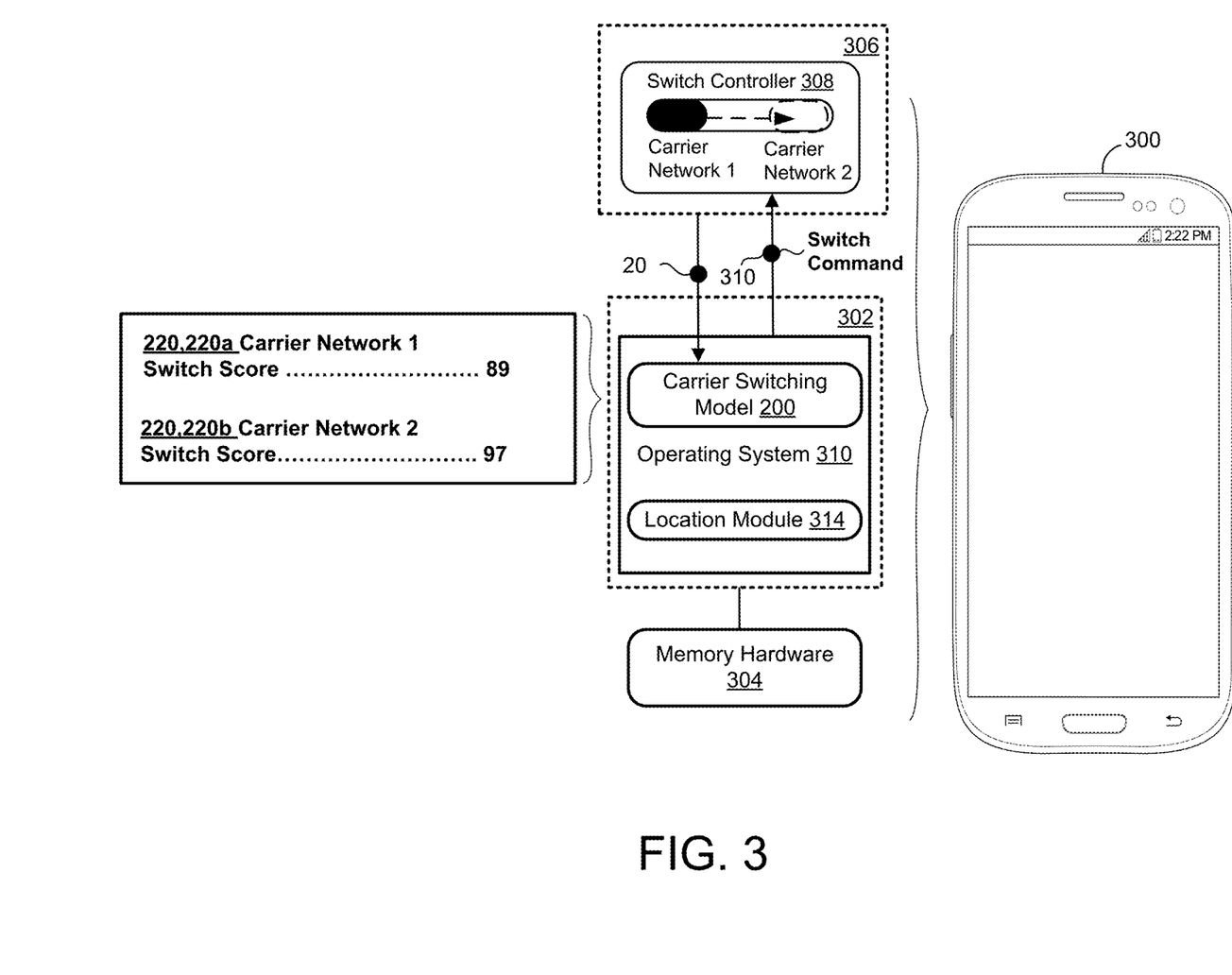
FIG. 3 is a schematic view of an example UE device using a carrier switching model to determine whether or not to switch carrier networks.

Decision forests may offer a middle path between the neural network and linear regression techniques. With proper constraints, decision forests are relatively interpretable and are capable of automatically learning nonlinearities and relationships. Decision forests can be thought of as a best one-size-fits-all among the techniques used for machine learning algorithms FIG. 3 shows an example UE device 300 having data processing hardware 302, memory hardware 304 in communication with the data processing hardware 302, and a transceiver 306. In the example shown, the UE 300 is a smart phone capable of obtaining available carrier networks 120 of carriers relative to a current location 305 of the UE 300 and switching connection to the available carrier network 120 predicted to offer the best network quality. The transceiver 306 is capable of wirelessly communicating over the air interface 110 with a base stations 102 (eBN) associated with an available carrier network 120 and the data processing hardware 302 executes an operating system 310. The carrier switching model 200 may run on the operating system 310. A location module 314 may further run on the operating system 310 for obtaining the current location 305 (FIG. 1) of the UE 300. For instance, the location module 314 may include a Global Positioning System (GPS) module or a Global Navigation Satellite System (GNSS) module configured to obtain location coordinates indicating the current location 305 of the UE 300.

UEs 300 may use a variety of different operating systems 310. In examples where a UE 300 is a mobile device (e.g., smart phone), the UE 300 may run an operating system including, but not limited to, ANDROID® developed by Google Inc., IOS® developed by Apple Inc., or WINDOWS PHONE® developed by Microsoft Corporation. Accordingly, the operating system 310 running on the UE 300 may include, but is not limited to, one of ANDROID®, IOS®, or WINDOWS PHONE®. In some examples a UE may run an operating system including, but not limited to, MICROSOFT WINDOWS® by Microsoft Corporation, MAC OS® by Apple, Inc., or Linux. UEs 300 may execute the carrier switching model 200 while running operating systems 310 other than those operating systems 310 described above, whether presently available or developed in the future.

In some implementations, a UE 300 receives the carrier switching model 200 for predicting which carrier network 120 among multiple available carrier networks 120 (e.g., two or more) will provide the best network quality (i.e., highest customer satisfaction) over a threshold period of time. The threshold period of time can include any value. For instance, the threshold period of time could be 30 minutes, 60 minutes, 90 minutes, or 120 minutes. The memory hardware 304 may store the carrier switching model 200 and instructions, that when executed by the data processing hardware 302, cause the data processing hardware 302 to execute the carrier switching model 200. In some examples, the UE 300 downloads a software application containing the carrier switching model 200. The carrier switching model 200 may be updated by the switching engine 150 based on new data and/or modifications to the features 210 to optimally define the proxy for customer satisfaction in terms of network quality.

The transceiver 306 may obtain connection performance metrics 20 for the currently-connected carrier network 120 (e.g., Carrier Network 1) such as signal strength, RAT, and the detected activity of the UE device 300 and provide the connection performance metrics 20 as real-time features to the carrier switching model 200 for determining a carrier switch score 220 for the carrier network 120. The carrier switching model 200 may further use the current location 305 as an input for determining the carrier switch score 220. Additionally, the transceiver 306 may additionally report the connection performance metrics 20 to the switching engine 150 (FIG. 1) for use in training the carrier switching model 200.

In the example shown, the transceiver 306 has an active connection with the first carrier network 120a (FIG. 1) and the second carrier network 120b (FIG. 1) corresponds to an "available" carrier network 120 that the UE 300 may switch connection to based on the carrier switch scores 220a, 220b output from the carrier switching model 200. The data processing hardware 302 uses the carrier switching model 200 to determine the carrier switch score 220a, 220b for each of the available first and second carrier networks 120a, 120b. In some configurations, the transceiver 306 includes a switch controller 308 capable of switching a connection to another available network 120 based on the switch scores 220 output by the carrier switching model 200. For instance, when the second carrier switch score 220b for the second available carrier network 120b satisfies a threshold criterion (e.g., the second carrier switch score 220b is greater than the first carrier switch score 220a by a threshold difference), the data processing hardware 302 may send a switch command 310 to the switch controller 308 to cause the transceiver 306 to switch connection to the second available carrier network 120b.

In the example shown, the carrier switching model 200 determines that the first carrier switch score 220a for the currently-connected first available carrier network 120a is equal to "89" and that the second carrier switch score 220b for the second available carrier network 120b is equal to "97". Here, the difference of "8" (e.g., 98-89) between the scores 220a, 220b satisfies a threshold difference such that data processing hardware 302 sends the switch command 310 to the switch controller 308 to cause the transceiver 306 to switch connection to the second available carrier network 120b. The carrier switch scores 220 may be based on features such as predicted signal strength, predicted RAT, and network cell recommendations at fixed intervals (e.g., every minute) during the threshold period of time. Scores may be assigned for the values of the features at each of the fixed intervals and totaled to determine the corresponding switch score 220 for each carrier network 120. The real-time features may further include the detected activity indicating whether or not the UE is driving and optionally the speed and/or bearing of the UE 300.

While the example only depicts two carrier networks 120 as available, other examples may include three or more available carrier networks 120 where the data processing hardware 302 determines a corresponding switch score 220 for each of the three or more available carrier networks 120. In some examples, each carrier switch score 220 is based on a predicted signal strength and/or a predicted RAT over the threshold period of time for the respective available carrier network 120a, 120b.

Since the UE 300 is currently-connected to the first available carrier network 120a, the first carrier switch score 220a output from the carrier switching model 200 corresponds to a prediction of what the network quality/experience will be over the threshold period of time if the UE 300 maintains the connection with the first available carrier network 120a. Here, the majority of the available features 210 only apply to the first available carrier network 120a. On the other hand, the second carrier switch score 220b output from the carrier switching model 200 for the second available carrier network 120b corresponds to a prediction of what the network quality/experience will be like over the threshold period of time if the UE 300 switches connection from the first available carrier network 120a to the second available carrier network 120b. In this case, many of the available features 210 may not be applicable for predicting future network quality on the second available carrier network 120b because such features are associated with the currently-connected first available carrier network 120a. Accordingly, some implementations include using one carrier switching model 200 with all the available features for determining a carrier switch score 220 (e.g., first carrier switch score 220a) for a currently-connected available carrier network 120 (e.g., first carrier network 120a), and a second carrier switching model 200 with fewer features 210 for determining a carrier switch score 220 (e.g., second carrier switch score 220b) for another available carrier network 120 (e.g., second carrier network 120b). By generating two carrier switching models 200, one for determining the switch score 220 for maintaining a connection and the other for determining the switch score 220 for switching connection, the switching engine 150 may have a lower risk of overfitting the models while achieving faster training times.

Figure 4:
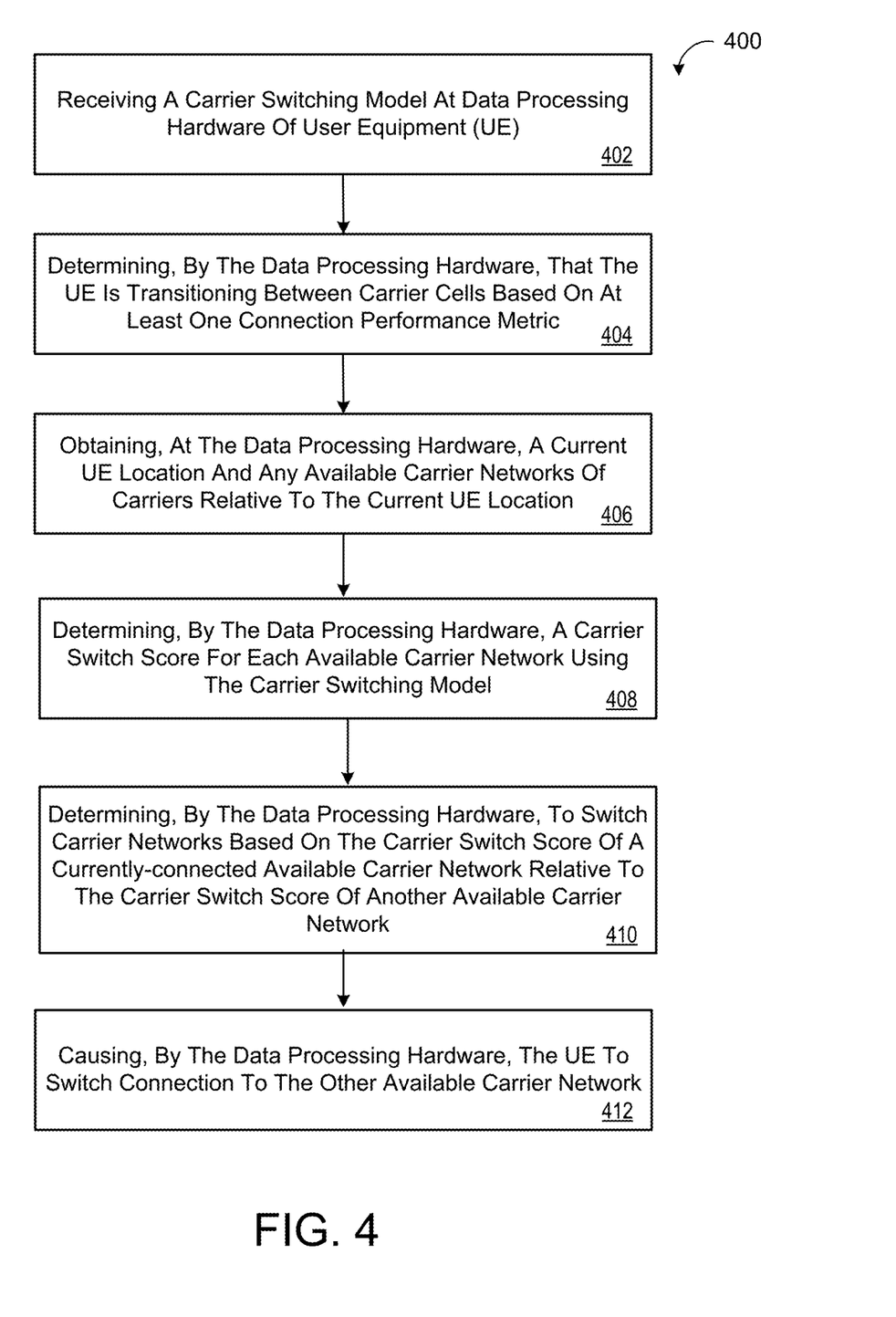
FIG. 4 is a flow chart of an example arrangement of operations for a method of switching carrier networks.

FIG. 4 provides an example arrangement of operations for a method 400 of switching carrier networks 120. At block 402, the method 400 includes receiving, at data processing hardware 302 of user equipment (UE) 300, a carrier switching model 200. At block 404, the method 400 includes determining, by the data processing hardware 302, that the UE 300 is transitioning between carrier cells based on at least one connection performance metric 20. Here, the at least one connection performance metric 20 can include a received signal strength measured by the UE 300. The transition can optionally be determined based on the UE 300 crossing over a geo-boundary associated with a carrier cell. At block 406, the method 400 includes obtaining, at the data processing hardware 302, a current UE location 305 and any available carrier networks 120 of carriers relative to the current UE location 305. The UE 300 may include a location module 314 configured to determine location coordinates indicative of the current UE location 305.

At block 408, the method 400 includes determining, by the data processing hardware 302, a carrier switch score 220 for each available carrier network 120 using the carrier switching model 200. Each carrier switch score 220 may be based on at least one of a predicted signal strength or a predicted RAT over a threshold period of time for the respective available carrier network. Here, the determining of the carrier switch score 220 for each available carrier network 120 may include executing the carrier switching model 200 using the current UE location 305 and the respective available carrier network 120 as inputs for the carrier switching model 200. In some examples, the data processing hardware 302 uses different carrier switching models for determining the carrier switch score 220 for a currently-connected available carrier network 120 and for determining the carrier switch scores 220 for one or more other available carrier networks 120. A switching engine 150 may execute a switching machine learning algorithm (e.g., deep neural network, neural network, linear regression, decision forest) go generate the carrier switching model 200 based on one or more features including a currently-connected carrier network, one or more available carrier networks, signal strength, radio access technology, length of time on a radio access technology, voice service state, mobile service state, detected activity, type of UE, current network cell recommendation, nearby network cell recommendation, indoor/outdoor UE location, bearing, or speed.

At block 410, the method 400 includes determining, by the data processing hardware 302, to switch carrier networks 120 based on the carrier switch score 120 of a currently-connected available carrier network relative to the carrier switch score of another available carrier network. In some examples, determining to switch carrier networks 120 includes determining that the corresponding carrier switch score 220 of the other available carrier network 120 satisfies a threshold criterion (e.g., is associated with a highest future network quality). The threshold criterion may include a threshold difference between the carrier switch score 220 of the currently-connected available carrier network 120 and the carrier switch score of the other available carrier network. The threshold difference may provide an indication that the switch scores 220 differ by an extent that makes switching connections worthwhile, given the drawbacks of switching downtime and reduction in battery life at the UE 300.

At block 412, the method 400 includes causing, by the data processing hardware 302, the UE 300 to switch connection to the other available carrier network 120. For instance, the data processing hardware 302 may send the switch command 310 to the switch controller 308 to cause the transceiver 306 to switch connection to the other available carrier network 120.

Figure 5:
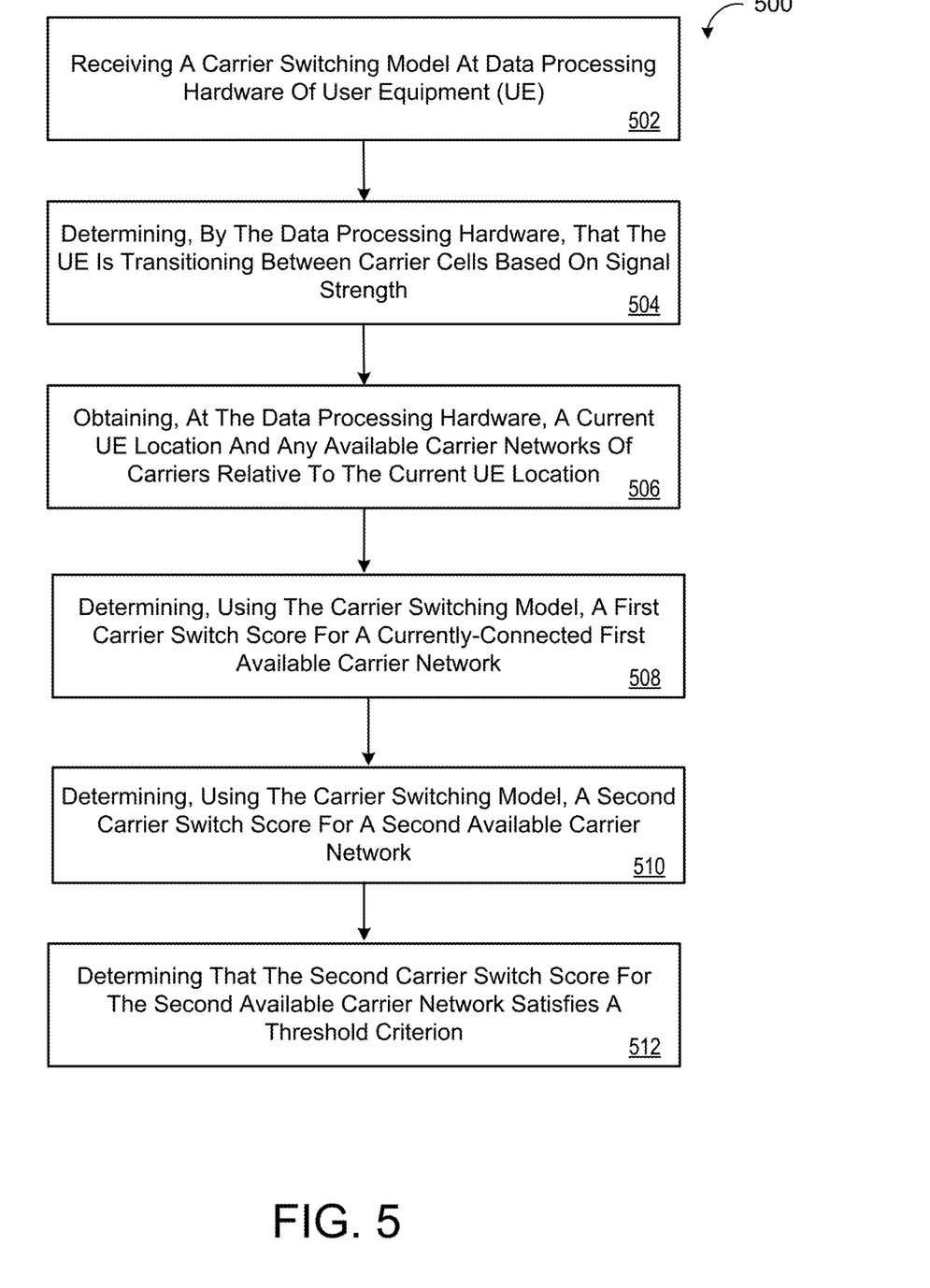
FIG. 5 is a flow chart of an example arrangement of operations for a method of switching carrier networks.

FIG. 5 provides an example arrangement of operations for a method 500 of switching carrier networks 120. At block 502, the method 500 includes receiving, at data processing hardware 302 of user equipment (UE) 300, a carrier switching model 200. At block 504, the method 500 includes determining, by the data processing hardware 302, that the UE 300 is transitioning between carrier cells based on signal strength. At block 506, the method 500 includes obtaining, at the data processing hardware 302, a current UE location 305 and any available carrier networks 120 of carriers relative to the current UE location 305. The UE 300 may include a location module 314 configured to determine location coordinates indicative of the current UE location 305.

The method 500 also includes the data processing hardware 302 determining to switch carrier networks 120 by: determining, using the carrier switching model 200, a first carrier switch score 220a for a currently-connected first available carrier network 120a based on the UE location 305 at block 508; determining, using the carrier switching model 200, a second carrier switch score 220b for a currently-connected second available carrier network 120b based on the UE location 305 at block 510; and determining that the second carrier switch score 220b for the second available carrier network satisfies a threshold criterion at block 512. The threshold criterion may include a threshold difference between the second carrier switch score 220b for the second available carrier network 120 and the first carrier switch score 220a for the currently-connected first available carrier network 120a. The threshold difference may provide an indication that the switch scores 220 differ by an extent that makes switching connections worthwhile, given the drawbacks of switching downtime and reduction in battery life at the UE 300.

The method 500 may also include causing, by the data processing hardware 302, the UE 300 to switch connection to the second available carrier network 120b. For instance, the data processing hardware 302 may send the switch command 310 to the switch controller 308 to cause the transceiver 306 to switch connection to the other available carrier network 120.

Figure 6:
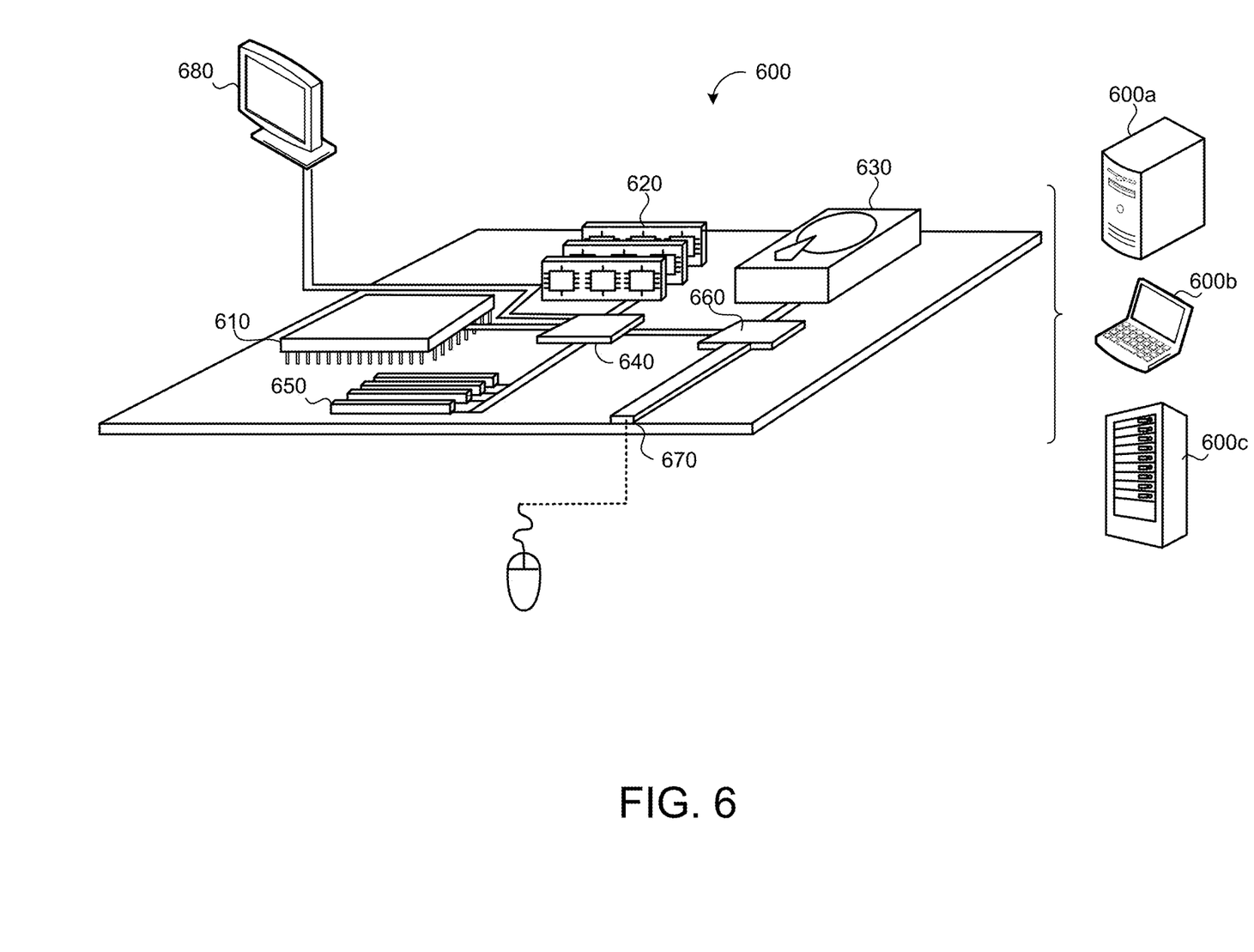
FIG. 6 is a schematic view of an example computing device that may be used to implement the systems and methods described herein.

FIG. 6 is schematic view of an example computing device 600 (e.g., data processing hardware) that may be used to implement the systems and methods described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 600 includes a processor 610, memory 620, a storage device 630, a high-speed interface/controller 640 connecting to the memory 620 and high-speed expansion ports 650, and a low speed interface/controller 660 connecting to low speed bus 670 and storage device 630. Each of the components 610, 620, 630, 640, 650, and 660, are interconnected using various busses, and may be mounted on a common motherboard or in other manners as appropriate. The processor 610 can process instructions for execution within the computing device 600, including instructions stored in the memory 620 or on the storage device 630 to display graphical information for a graphical user interface (GUI) on an external input/output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 (e.g. memory hardware) is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 930, or memory on processor 610.

The high speed controller 640 manages bandwidth-intensive operations for the computing device 900, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and low-speed expansion port 670. The low-speed expansion port 670, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 600a or multiple times in a group of such servers 600a, as a laptop computer 600b, or as part of a rack server system 600c.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method comprising:
   receiving, at data processing hardware of a user equipment (UE), a carrier switching model;
   determining, by the data processing hardware of the UE, that the UE is transitioning between carrier cells based on at least one connection performance metric of the UE;
   obtaining, at the data processing hardware of the UE, a current UE location and any available carrier networks of carriers relative to the current UE location;
   detecting, by the data processing hardware of the UE, an activity of the UE for a corresponding available carrier network the UE is currently connected to at the current UE location, the detected activity of the UE indicating whether the UE is moving or stationary;
   determining, by the data processing hardware of the UE, two or more time intervals during a threshold period of time in the future from a present time;
   for each of the two or more time intervals, predicting, by the data processing hardware of the UE, a feature of each available carrier network corresponding to the respective time interval, the predicted feature comprising at least one of a predicted signal strength or a predicted radio access technology for the respective available carrier network;
   determining, by the data processing hardware of the UE, an overall carrier switch score for each available carrier network using the carrier switching model, each overall carrier switch score comprising a weighted average of two or more carrier switch scores corresponding to the two or more time intervals, each carrier switch score of the two or more carrier switch scores based on the detected activity of the UE and the corresponding predicted feature for the respective available carrier network;
   determining, by the data processing hardware of the UE, to switch carrier networks based on the overall carrier switch score of a currently-connected available carrier network relative to the overall carrier switch score of another available carrier network;
reporting, by the data processing hardware of the UE, the detected activity of the UE for the currently-connected available carrier network to a switching engine in communication with the UE by transmitting the detected activity, that indicates whether the UE is moving or stationary, over the currently-connected available carrier network to the switching engine, the switching engine configured to train the carrier switching model using the detected activity of the UE for the currently-connected available carrier network; and
causing, by the data processing hardware of the UE, the UE to switch connection to the other available carrier network.

2. The method of claim 1, wherein the carrier switching model is generated by a carrier switching machine learning algorithm based on one or more features comprising a currently-connected carrier network, one or more available carrier networks, signal strength, radio access technology, length of time on a radio access technology, voice service state, mobile service state, detected activity, type of UE, current network cell recommendation, nearby network cell recommendation, indoor/outdoor UE location, bearing, or speed.

3. The method of claim 1, wherein the carrier switching model is trained on data comprising crowd-sourced user-experience ratings of carrier networks at corresponding UE locations.

4. The method of claim 1, wherein the connection performance metric comprises signal strength.

5. The method of claim 1, wherein determining the carrier switch score for each available carrier network comprises, for each available carrier network, executing the carrier switching model using the current UE location and the respective available carrier network as inputs for the carrier switching model.

6. The method of claim 1, wherein determining to switch carrier networks comprises determining that the corresponding carrier switch score of the other available carrier network satisfies a threshold criterion.

7. The method of claim 6, wherein the threshold criterion comprises a threshold difference between the carrier switch score of the currently-connected available carrier network and the carrier switch score of the other available carrier network.

8. A method comprising:
receiving, at data processing hardware of a user equipment (UE), a carrier switching model;
determining, by the data processing hardware of the UE, that the UE is transitioning between carrier cells based on signal strength;
obtaining, at the data processing hardware of the UE, a current UE location and any available carrier networks of carriers relative to the current UE location;
detecting, by the data processing hardware of the UE, an activity of the UE for a corresponding first available carrier network the UE is currently connected to at the current UE location, the detected activity of the UE indicating whether the UE is moving or stationary;
determining, by the data processing hardware, to switch carrier networks by:
  determining, by the data processing hardware of the UE, two or more time intervals during a threshold period of time in the future from a present time;
  for each of the two or more time intervals, predicting, by the data processing hardware of the UE, a feature of each available carrier network corresponding to the time interval, the predicted feature comprising at least one of a predicted signal strength or a predicted radio access technology for the respective available carrier network;
  determining, using the carrier switching model, a first overall carrier switch score for a currently-connected first available carrier network based on the UE location;
  determining, using the carrier switching model, a second overall carrier switch score for a second available carrier network based on the UE location; and
  determining that the second overall carrier switch score for the second available carrier network satisfies a threshold criterion, each overall carrier switch score comprising a weighted average of two or more carrier switch scores corresponding to the two or more time intervals, each of the two or more carrier switch scores based on the detected activity of the UE and the corresponding predicted feature for the respective available carrier network;
reporting, by the data processing hardware of the UE, the detected activity of the UE for the currently-connected first available carrier network to a switching engine in communication with the UE by transmitting the detected activity, that indicates whether the UE is moving or stationary, over the currently-connected first available carrier network to the switching engine, the switching engine configured to train the carrier switching model using the detected activity of the UE for the currently-connected available carrier network; and
causing, by the data processing hardware, the UE to switch connection to the second available carrier network.

9. The method of claim 8, wherein the carrier switching model is generated by a carrier switching machine learning algorithm based on one or more features comprising a currently-connected carrier network, one or more available carrier networks, signal strength, radio access technology, length of time on a radio access technology, voice service state, mobile service state, detected activity, type of UE, current network cell recommendation, nearby network cell recommendation, indoor/outdoor UE location, bearing, or speed.

10. The method of claim 8, wherein the carrier switching model is trained on data comprising crowd-sourced user-experience ratings of carrier networks at corresponding UE locations.

11. The method of claim 8, wherein the threshold criterion comprises a threshold difference between the carrier switch score of the first available carrier network and the carrier switch score of the second available carrier network.

12. A user equipment (UE) comprising:
data processing hardware; and
memory hardware in communication with the data processing hardware, the memory hardware storing instructions that when executed on the data processing hardware cause the data processing hardware to perform operations comprising:
  receiving a carrier switching model;
  determining that the UE is transitioning between carrier cells based on at least one connection performance metric of the UE;

obtaining a current UE location and any available carrier networks of carriers relative to the current UE location;

detecting an activity of the UE for a corresponding available carrier network the UE is currently connected to at the current UE location, the detected activity of the UE indicating whether the UE is moving or stationary;

determining two or more time intervals during a threshold period of time in the future from a present time;

for each of the two or more time intervals, predicting a feature of each available carrier network corresponding to the time interval, the predicted feature comprising at least one of a predicted signal strength or a predicted radio access technology for the respective available carrier network;

determining an overall carrier switch score for each available carrier network using the carrier switching model, each overall carrier switch score comprising a weighted average of two or more carrier switch scores corresponding to the two or more time intervals, each of the two or more carrier switch scores based on the detected activity of the UE and the corresponding predicted feature for the respective available carrier network;

determining to switch carrier networks based on the overall carrier switch score of a currently-connected available carrier network relative to the overall carrier switch score of another available carrier network;

reporting, by the data processing hardware, the detected activity of the UE for the currently-connected available carrier network to a switching engine in communication with the UE by transmitting the detected activity, that indicates whether the UE is moving or stationary, over the currently-connected available carrier network to the switching engine, the switching engine configured to train the carrier switching model using the detected activity of the UE for the currently-connected available carrier network; and causing the UE to switch connection to the other available carrier network.

13. The UE of claim 12, wherein the carrier switching model is generated by a carrier switching machine learning algorithm based on one or more features comprising a currently-connected carrier network, one or more available carrier networks, signal strength, radio access technology, length of time on a radio access technology, voice service state, mobile service state, detected activity, type of UE, current network cell recommendation, nearby network cell recommendation, indoor/outdoor UE location, bearing, or speed.

14. The UE of claim 12, wherein the carrier switching model is trained on data comprising crowd-sourced user-experience ratings of carrier networks at corresponding UE locations.

15. The UE of claim 12, wherein the connection performance metric comprises signal strength.

16. The UE of claim 12, wherein determining the carrier switch score for each available carrier network comprises, for each available carrier network, executing the carrier switching model using the current UE location and the respective available carrier network as inputs for the carrier switching model.

17. The UE of claim 12, wherein determining to switch carrier networks comprises determining that the corresponding carrier switch score of the other available carrier network satisfies a threshold criterion.

18. The UE of claim 17, wherein the threshold criterion comprises a threshold difference between the carrier switch score of the currently-connected available carrier network and the carrier switch score of the other available carrier network.

19. A user equipment (UE) comprising:

data processing hardware; and memory hardware in communication with the data processing hardware, the memory hardware storing instructions that when executed on the data processing hardware cause the data processing hardware to perform operations comprising:

receiving a carrier switching model;

determining that the UE is transitioning between carrier cells based on signal strength;

obtaining a current UE location and any available carrier networks of carriers relative to the current UE location;

detecting an activity of the UE for a corresponding first available carrier network the UE is currently connected to at the current UE location, the detected activity of the UE indicating whether the UE is moving or stationary;

determining to switch carrier networks by:

determining, by the data processing hardware of the UE, two or more time intervals during a threshold period of time in the future from a present time;

for each of the two or more time intervals, predicting, by the data processing hardware of the UE, a feature of each available carrier network corresponding to the time interval, the predicted feature comprising at least one of a predicted signal strength or a predicted radio access technology for the respective available carrier network;

determining, using the carrier switching model, a first overall carrier switch score for a currently-connected first available carrier network based on the UE location;

determining, using the carrier switching model, a second overall carrier switch score for a second available carrier network based on the UE location; and determining that the second overall carrier switch score for the second available carrier network satisfies a threshold criterion, each overall carrier switch score comprising a weighted average of two or more carrier switch scores corresponding to the two or more time intervals, each of the two or more carrier switch scores for the respective available carrier network;

reporting the detected activity of the UE for the currently-connected first available carrier network to a switching engine in communication with the UE by transmitting the detected activity, that indicates whether the UE is moving or stationary, over the currently-connected first available carrier network to the switching engine, the switching engine configured to train the carrier switching model using the detected activity of the UE for the currently-connected first available carrier network; and causing the UE to switch connection to the second available carrier network.

20. The UE of claim 19, wherein the carrier switching model is generated by a carrier switching machine learning algorithm based on one or more features comprising a currently-connected carrier network, one or more available carrier networks, signal strength, radio access technology, length of time on a radio access technology, voice service state, mobile service state, detected activity, type of UE, current network cell recommendation, nearby network cell recommendation, indoor/outdoor UE location, bearing, or speed.

21. The UE of claim 19, wherein the carrier switching model is trained on data comprising crowd-sourced user-experience ratings of carrier networks at corresponding UE locations.

22. The UE of claim 19, wherein the threshold criterion comprises a threshold difference between the carrier switch score of the first available carrier network and the carrier switch score of the second available carrier network.

* * * * *